United States Patent
Shieh

Patent Number: 5,388,436
Date of Patent: Feb. 14, 1995

[54] MOTORCYCLE DISK BRAKE LOCK

[76] Inventor: Jin-Ren Shieh, No. 178, Shih Chia Rd., Taichung, Taiwan, Prov. of China

[21] Appl. No.: 254,612

[22] Filed: Jun. 6, 1994

[51] Int. Cl.⁶ .................................................. G62H 5/14
[52] U.S. Cl. ...................................... 70/226; 188/69; 70/34; 70/233
[58] Field of Search ........................... 188/31, 60, 69; 74/813 L; 70/34, 233, 226, 33, 38 R, 228

[56] References Cited

U.S. PATENT DOCUMENTS 4,294,090 10/1981 Metzger .......................... 188/31
5,265,451 11/1993 Phifer ............................. 70/233

FOREIGN PATENT DOCUMENTS 82200455 1/1982 Taiwan, Prov. of China.

Primary Examiner—Robert J. Oberleitner
Assistant Examiner—Clifford T. Bartz
Attorney, Agent, or Firm—Browdy and Neimark

[57] ABSTRACT

A motorcycle disk brake lock comprises a first arm, a second arm, and a lock main body. A gap is located between the first and the second arms. A lock bolt is provided with a straight leg portion and a curved portion. The straight leg portion is disposed slidably in the first arm while the curved portion of the lock bolt extends toward the second arm and across the gap. A lock bolt fastening pin is disposed in a base portion of the lock main body such that the lock bolt fastening pin can be moved between a first position and a second position, and that the lock bolt fastening pin restrains the lock bolt when located at the first position. A lock having a lock cylinder and a lock core is disposed in the base portion of the lock main body such that the lock core of the lock is coupled with the lock bolt fastening pin, which can be caused to move to the first position from the second position when the lock core is located at a locking position. The lock bolt fastening pin is caused to move back to the second position when the lock core is located at an unlocking position. A lock bolt position limiting pin is fastened to the first arm such that one end of the lock bolt position limiting pin extends to remain in a position limiting slot of the straight leg portion for limiting the moving range of the lock bolt.

6 Claims, 2 Drawing Sheets

MOTORCYCLE DISK BRAKE LOCK

FIELD OF THE INVENTION

The present invention relates generally to a vehicle lock, and more particularly to a motorcycle disk brake lock.

BACKGROUND OF THE INVENTION

The Taiwanese Patent No. 82200455 discloses a motorcycle disk brake lock, which comprises a rectangular lock body provided with a slot dimensioned to receive therein a motorcycle disk brake. The motorcycle disk brake is then arrested by a lock bolt which is put horizontally through one heat-radiating hole of the disk brake shoe, thereby incapacitating the motorcycle. Such a prior art motorcycle disk brake lock as described above is defective in design in that the lock body of the disk brake lock can fasten only the outer edge of the disk brake shoe if the distance between the lock bolt and the slot is too small, and that the inner portion of the lock body can touch the wheel hub of the motorcycle wheel to prevent the lock bolt to be put through the heat-radiating hole of the disk brake shoe if the distance between the lock bolt and the slot is too great. The similar situations as described above can also take place if the outer diameter of the disk brake shoe is too small.

SUMMARY OF THE INVENTION

It is therefore the primary objective of the present invention to provide a motorcycle disk brake lock with a slot and a lock bolt, which are so constructed that the distance between the slot and the lock bolt can be adjusted as required.

It is another objective of the present invention to provide a motorcycle disk brake lock which can be used to disable the motorcycle disk brake shoes of various outer diameters.

The foregoing objectives of the present invention are attained by a motorcycle disk brake lock, which comprises a first arm, a second arm, and a lock main body. Located between the first arm and the second arm is a gap. A lock bolt is provided with a straight leg portion and a curved portion. The straight leg portion of the lock bolt is disposed slidably in the first arm while the curved portion of the lock bolt extends toward the second arm and across the gap. A lock bolt fastening pin is disposed in a base portion of the lock main body such that the lock bolt fastening pin can be moved between a first position and a second position, and that the lock bolt fastening pin restrains the lock bolt when located at the first position. A lock having a lock cylinder and a lock core is disposed in the base portion of the lock main body such that the lock core of the lock is coupled with the lock bolt fastening pin, which can be caused to move to the first position from the second position when the lock core is located at a locking position. The lock bolt fastening pin is caused to move back to the second position when the lock core is located at an unlocking position. A lock bolt position limiting pin is fastened to the first arm such that one end of the lock bolt position limiting pin extends to remain in a position limiting slot of the straight leg portion of the lock bolt for limiting the moving range of the lock bolt.

DETAILED DESCRIPTION OF THE INVENTION

Figure 1:
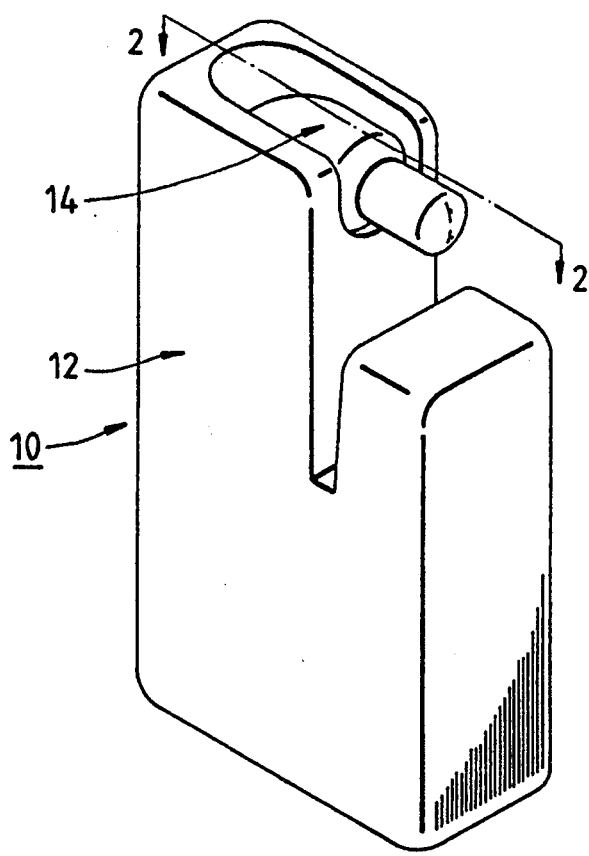
FIG. 1 shows a perspective view of the present invention.

As shown in FIGS. 1–4, a motorcycle disk brake lock 10 of the present invention comprises a lock main body 12, a lock bolt 14, a lock bolt fastening pin 16, a spring 18, a lock 20, and a lock bolt position limiting pin 22.

The lock main body 12 has a first arm 24, a second arm 26, and a base portion 28 for coupling one end of the first arm 24 and the second arm 26. The first arm 24 is provided along the longitudinal axis thereof with an open end which is higher in location than the second arm 26. Located between the first and the second arms 24 and 26 is a gap 30 dimensioned to receive therein a portion of a motorcycle disk brake shoe. A lock bolt channel 32 extends to reach the base portion 28 from the open end of the first arm 24. A cut 33 is provided such that it is in communication with the lock bolt channel 32 and the gap 30. A lock bolt fastening pin channel 34 extends vertically to reach the base portion 28 from the wall of the lock bolt channel 32. A lock cylinder channel 36 extends vertically from the bottom of the base 28 and communicates with the lock bolt fastening pin channel 34 via a passageway 38.

The lock bolt 14 has a straight leg portion 10 of a cylindrical construction, and a curved portion 42 extending vertically and outwardly from one end of the straight leg portion 40 which is received in the lock bolt channel 32. The straight leg portion 40 is provided on one side of the periphery thereof with a toothed portion 43 extending along the direction of the longitudinal axis of the straight leg portion 40. On the other hand, the straight leg portion 40 is provided on another side of the periphery thereof with a position limiting slot 44 extending along the direction of the longitudinal axis of the straight leg portion 40. The curved portion 42 extends toward the second arm 26 and across the gap 30 and is provided at the front end thereof with a bolt head 46 having an outer diameter small enough to permit the bolt head 46 to go through the heat-radiating hole of the motorcycle disk brake shoe. The curved portion 42 is received in the cut 33 when the straight leg portion 40 is located at the lowest position.

The lock bolt fastening pin 16 is received in the lock bolt fastening pin channel 34. The spring 18 is disposed between the lock bolt fastening pin 16 and the bottom of the lock bolt fastening pin channel 34. In the absence of an external force, the elastic force of the spring 18 causes the lock bolt fastening pin 16 to move to a first portion from a second position. As the lock bolt fastening pin 16 is located at the first position, the pin head 48 of the lock bolt fastening pin 16 is inserted into one of the grooves of the toothed portion 43 so as to arrest the lock bolt 14.

Figure 2:
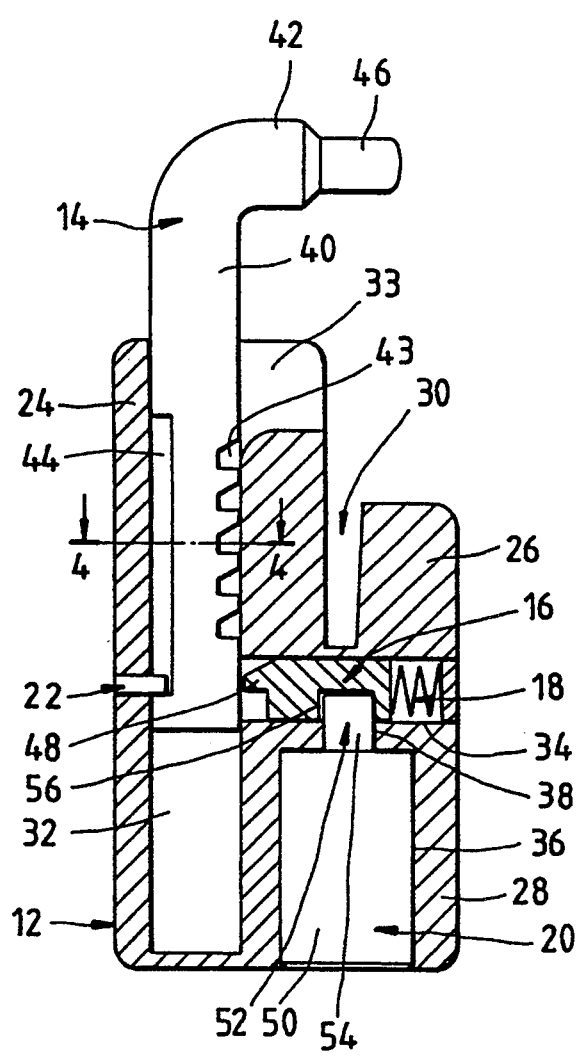
FIG. 2 is a sectional view which is taken along the line 2—2 as shown in FIG. 1 and which shows the lock bolt that is not restrained by the lock bolt fastening pin.
Figure 3:
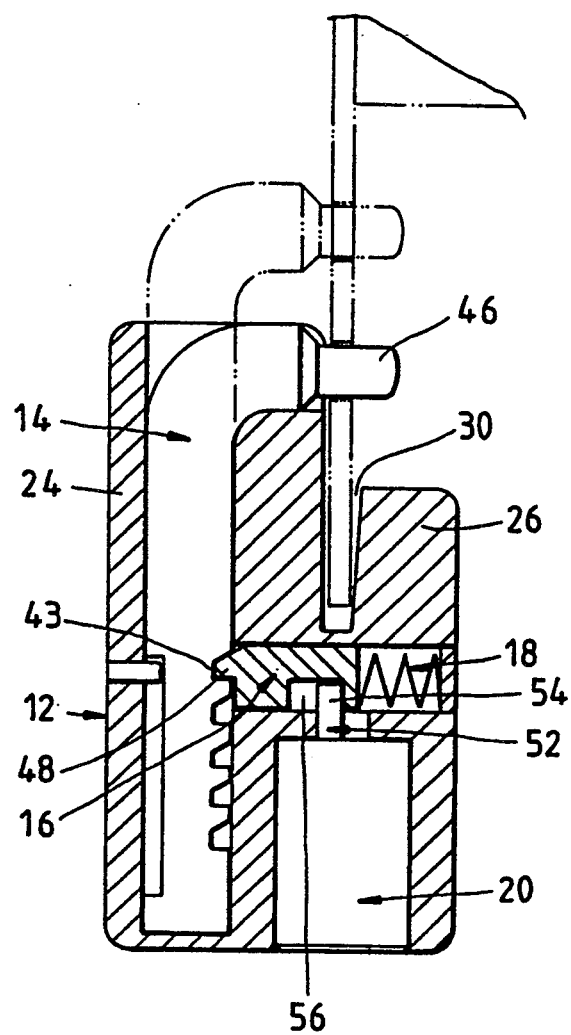
FIG. 3 is a sectional view which is taken along the line 2—2 as shown in FIG. 1 and which shows the lock bolt that is restrained by the lock bolt fastening pin and is put through a heat-radiating hole of a motorcycle disk brake shoe.
Figure 4:
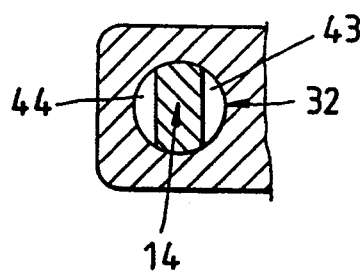
FIG. 4 shows a sectional view taken along the direction indicated by a line 4—4 in FIG. 2.

The lock 20 has a lock cylinder 50, and a lock core 52 disposed in the lock cylinder 50. The lock core 52 can be actuated by a key to rotate between a locking position and an unlocking position. The lock core 52 is provided at the open end thereof with a projected portion 54 of rectangular construction. The lock cylinder 50 is received in the lock cylinder channel 36 such that the projected portion 54 is inserted into a projected portion slot 56 of the lock bolt fastening pin 16 via the passageway 38. When the lock core 24 is located at an unlocking position, the lock bolt fastening pin 16 is caused by the projected portion 54 to locate at the second position such that the lock bolt fastening pin 16 urges the spring 18, as shown in FIG. 2. When the lock core 24 is located at the locking position, the projected portion 54 is caused to rotate to another position so that the elastic force of the released spring 18 pushes the lock bolt fastening pin 16 to the first position, as shown in FIG. 3.

The lock bolt position limiting pin 22 is fastened to the first arm 24 such that one end of the pin 22 is received in the lock bolt position limiting slot 44. As a result, the lock bolt 14 can not be arrested by the lock bolt fastening pin 16 and is therefore free to slide within the range of the length of the lock bolt position limiting slot 44, as shown in FIG. 2.

If the shoe size of the motorcycle disk brake intended to be locked is relatively small, the second arm 26 of the lcok main body 12 should be located at the inner side of the disk brake shoe while the first arm 24 is located at the outer side of the disk brake shoe. Thereafter, the lock bolt 14 is pressed toward the lock main body 12 so as to shorten the distance between the bolt head 46 and the gap 30. When a portion of the motorcycle disk brake shoe is received in the gap 30, the bolt head 46 is put through a heat-radiating hole which is corresponding in location to the bolt head 46, as shown by the solid lines in FIG. 3. If the lock 20 is turned to the locking position, the lock bolt 14 is arrested at the locking position, thereby causing the motorcycle disk brake lock 10 of the present invention to fasten securely to the motorcycle disk brake shoe. If the outer diameter of the shoe size of the motorcycle disk brake intended to be locked is relatively large, or if the disk brake lock 10 of the present invention is to be fastened securely to a place contiguous to the center of the motorcycle disk brake shoe, the lock bolt 14 must be pulled outwards so as to increase the distance between the bolt head 46 and the gap 30. As a result, the bolt head 46 can be put through a heat-radiating hole which is located farther from the edge of the disk brake shoe, as shown by the dotted lines in FIG. 3. Furthermore, the lock bolt 14 is provided with the toothed portion 43 having a plurality of grooves. The lock bolt fastening pin 16 can be therefore inserted into one of these grooves of the toothed portion 43 so as to arrest the lock bolt 14 even though the lock bolt 14 is pulled outwards. It must be noted that the second arm 26 is located at the lower level than the first arm 24 so as to prevent the inner portion of the lock body from making contact with the motorcycle wheel hub.

What is claimed is:

1. A motorcycle disk brake lock comprising:
   a motorcycle disk brake shoe, a first arm, a second arm, and a lock main body made up of a base portion coupling one end of said first arm and one end of said second arm, said lock main body having a gap located between said first arm and said second arm and dimensioned to receive therein a portion of said motorcycle disk brake shoe;
   a lock bolt channel extending to reach said base portion from an open end of said first arm, a lock bolt fastening pin channel extending to reach said base portion from a side of a channel wall of said lock bolt channel, a lock cylinder channel extending inwards from a bottom of said base portion;
   a lock bolt having a straight leg portion and a curved portion extending outwards at a predetermined angle from one end of said straight leg portion which is slidably received in said lock bolt channel, said curved portion being capable of causing an open end thereof to move toward said second arm and across said gap to enter one heat-radiating hole of said motorcycle disk brake shoe at the time when said straight leg portion is located at a predetermined position, said straight leg portion having a toothed portion which is provided with a plurality of grooves arranged in a row along the direction of a longitudinal axis of said straight leg portion, said straight leg portion further having along the direction of said longitudinal axis thereof a lock bolt position limiting slot of a predetermined length;
   a lock bolt fastening pin disposed in said lock bolt fastening pin channel such that said lock bolt fastening pin can be caused to move between a first position and a second position, and that said lock bolt fastening pin is inserted into one of said grooves of said toothed portion of said lock bolt at the time when said lock bolt fastening pin is located at said first position;
   a lock bolt position limiting pin fastened to said first arm such that one end of said lock bolt position limiting pin is received in a lock bolt position limiting slot for limiting said lock bolt to slide within the range of a length of said lock bolt position limiting slot; and
   a lock having a lock cylinder and a lock core received in said lock cylinder which is in turn received in a lock cylinder channel such that said lock core is coupled with said lock bolt fastening pin which can be caused to move to said first position from said second position at the time when said lock core is turned by a key to a locking position, said lock bolt fastening pin capable of being caused to move back to said second position from said first position at the time when said lock core is turned by said key to an unlocking position.

2. The motorcycle disk brake lock of claim 1 wherein said first arm is longer than said second arm.

3. The motorcycle disk brake lock of claim 1 wherein said first arm is provided with a cut which is adjacent to said gap and in communication with an upper end of said lock bolt channel for receiving therein said curved portion at the time when said lock bolt is located at a lowest position.

4. The motorcycle disk brake lock of claim 1 wherein said open end of said curved portion of said lock bolt is provided with a bolt head having an outer diameter smaller than that of said curved portion.

5. The motorcycle disk brake lock of claim 1 wherein said lock bolt fastening pin is urged by a biasing means to keep said lock bolt fastening pin at said first position at the time when there is the absence of an external force exerting on said lock bolt fastening pin, said biasing means being disposed between a end of said lock bolt fastening pin channel and said lock bolt fastening pin.

6. The motorcycle disk brake lock of claim 5 wherein said lock bolt fastening pin is provided with a projected portion slot dimensioned to receive therein a projected portion of said lock core, said projected portion being capable of causing said lock bolt fastening pin to move to said second position and to compress said biasing means at the time when said lock core is located at said unlocking position, said projected portion further being capable of moving to release said biasing means so as to force said lock bolt fastening pin to move to said first position at the time when said lock core is located at said locking position.

* * * * *